United States Patent [19]
Hill

[11] Patent Number: 5,588,246
[45] Date of Patent: Dec. 31, 1996

[54] INTERCHANGEABLE EYES FOR FISHING LURES

[76] Inventor: Curtis J. Hill, 920-28th Ave. S., Moorhead, Minn. 56560

[21] Appl. No.: 429,664

[22] Filed: Apr. 27, 1995

[51] Int. Cl.$^6$ .................................................. A01K 85/00
[52] U.S. Cl. .................................. 43/42.06; 43/42.34
[58] Field of Search ........................ 43/42.06, 42.09, 43/42.32, 42.34

[56] References Cited

U.S. PATENT DOCUMENTS

| | | | |
|---|---|---|---|
| 2,477,460 | 7/1949 | Larson | 43/42.34 |
| 3,855,722 | 12/1974 | Moore | 43/42.34 |
| 3,881,272 | 5/1975 | Parker | 43/42.34 |
| 4,637,159 | 1/1987 | Kulis | 43/42.32 |
| 4,993,183 | 2/1991 | Carver | 43/42.06 |
| 5,148,622 | 9/1992 | Blair | 43/42.06 |
| 5,170,580 | 12/1992 | Rosenblott | 43/42.06 |

FOREIGN PATENT DOCUMENTS

| | | | |
|---|---|---|---|
| 0344908 | 11/1904 | France | 43/42.06 |

*Primary Examiner*—Joseph J. Hail, III
*Assistant Examiner*—James Miner
*Attorney, Agent, or Firm*—David A. Lingbeck

[57] ABSTRACT

Interchangeable eyes for fishing lures comprising eye fastening members on the head of the fishing lures, simulated eyes detachably attached to the eye fastening members and having a simulated pupil protruding therefrom, and further comprising distinctively colored spongy material removably retentive to the eyes for retaining and releasing selective fish-alluring scents into the water for attracting game fish onto the hooks of the fishing lures. These fishing lures resemble the prey of the fish so that the fish will try to feed upon the fishing lures and as they do so they will become hooked upon the hooks depending from the fishing lures.

3 Claims, 4 Drawing Sheets

INTERCHANGEABLE EYES FOR FISHING LURES

BACKGROUND OF THE INVENTION

This invention relates to interchangeable eyes for fishing lures. This invention came about after studying the feeding habits of most game fish upon smaller species of fish. It was found that game fish are attracted to and attack the eyes of their prey when they feed. As a result, it was desirable to come up with a fishing lure which not only took on the shape of the prey but also had eyes similar to the prey.

The prior art is deluged with the "perfect" fishing lures, some of which have distinctive colors to attract the game fish and some of which have distinctive shapes so that they move through the water in a distinctive manner similar to the movements of the prey of the game fish.

One known prior art is REMOVABLE EYES FOR FISHING LURES, U.S. Pat. No. 5,209,007, INVENTED BY JACK G. SOUTHERLAND and ISSUED ON MAY 11, 1993, which comprises simulated eyes and an elongated barbed shank carried by each of the eyes, the barbed shank having a shank bend opposite the eye, which is inserted in the head of the fishing lure with the eye essentially protruding therefrom. The shank is engaged inside the head of the fishing lure and can be removed as desired by the user. This invention is primarily useful for fishing lures having extensive bodies so that the shank can be inserted in the body itself. However, most fishing lures are flat and contoured and don't have extensive bodies into which something can be engaged, thus limiting the use of a shank to secure an eye in the fishing lure.

SUMMARY OF THE INVENTION

The present invention relates to interchangeable eyes for fishing lures comprising eye receiving members made of plastic or some sort of alloy and fixedly attached to the surface and head of the fishing lures, and further comprising simulated eyes also made of plastic or some sort of alloy and detachably attached to the eye receiving members, and colored spongy clothlike material removably retentive upon the eyes for absorbing and releasing selected fish-alluring scents which are gradually released into the water as the fishing lure is moved through the water to attract particular game fish.

One object of the present invention is to provide interchangeable eyes for fishing lures which simulate the eyes of fish which are preyed upon by the game fish.

Another object of the present invention is to provide interchangeable eyes for fishing lures which can be attached to fishing lures made of plastic or metal and being of any shape and size.

Also, another object of the present invention is to provide interchangeable eyes for fishing lures which can absorb and release fish alluring scents into the water to attract particular game fish.

Further, another object of the present invention is to provide interchangeable eyes for fishing lures which can be easily and conveniently attached and detached to the fishing lures and interchanged across fishing lures.

Yet, another object of the present invention is to provide interchangeable eyes for fishing lures, which can be of distinctive colors to attract particular game fish.

Further objects and advantages of the present invention will become apparent as the description proceeds and when taken in conjunction with the accompanying drawings wherein:

DETAILED DESCRIPTION OF THE INVENTION

Figure 1:
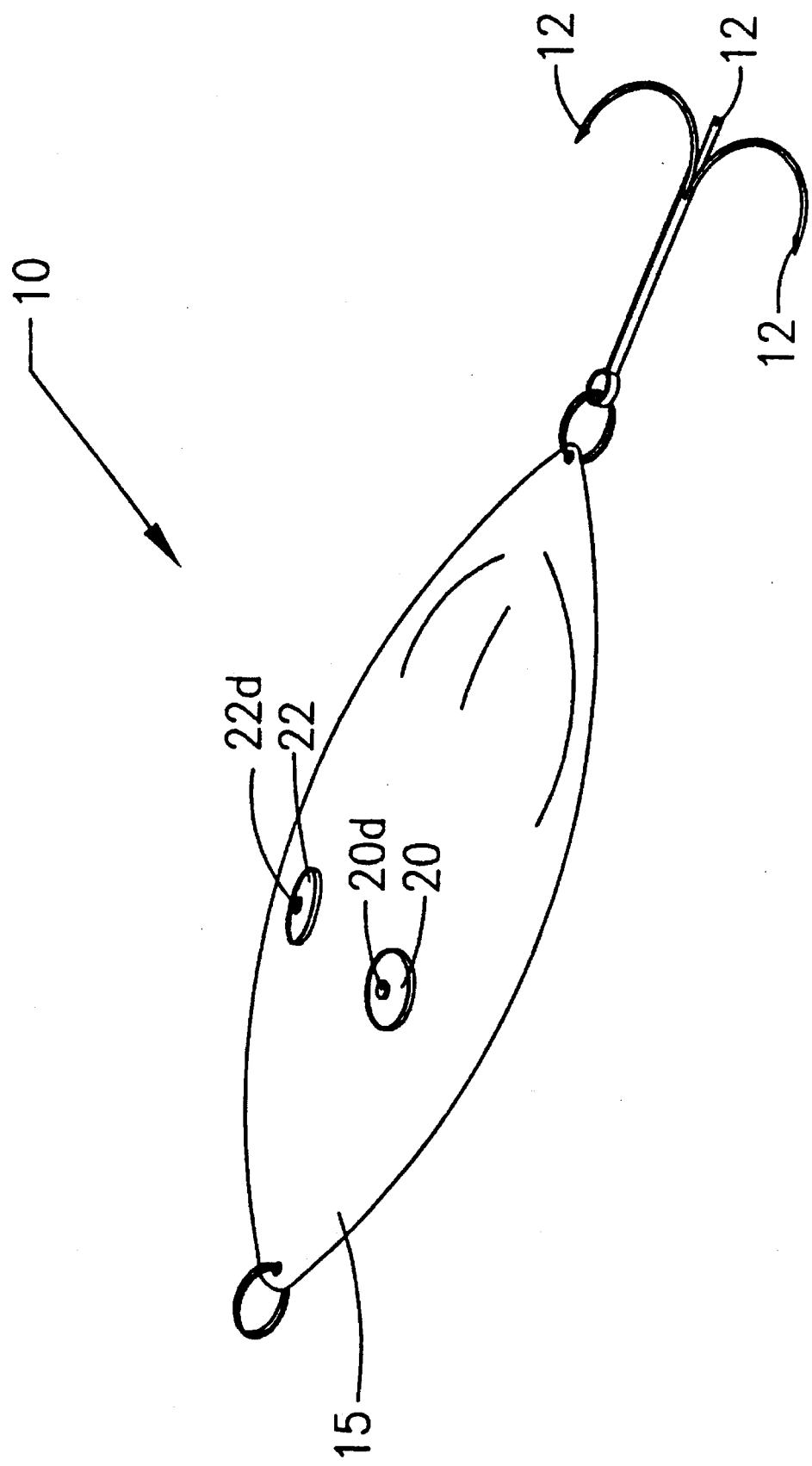
FIG. 1 is a top perspective view of the eyes attached to a fishing lure.

Referring to the drawings in FIGS. 1–4, the combination of fishing lures comprises fishing lures 10 made of plastic or metal and carrying fishing hooks 12, and further comprises generally disc-shaped eye fastening members 16 & 18 fixedly attached in spaced relationship and closely to the head 15 of the fishing lures 10, simulated eyes 20 & 22 detachably attached to the eye fastening members 16 & 18, and distinctively colored spongy material 25 & 26 retentive upon the simulated eyes 20 & 22 for retaining and releasing selected fish-alluring scents in the water to attract the game fish.

Figure 2:
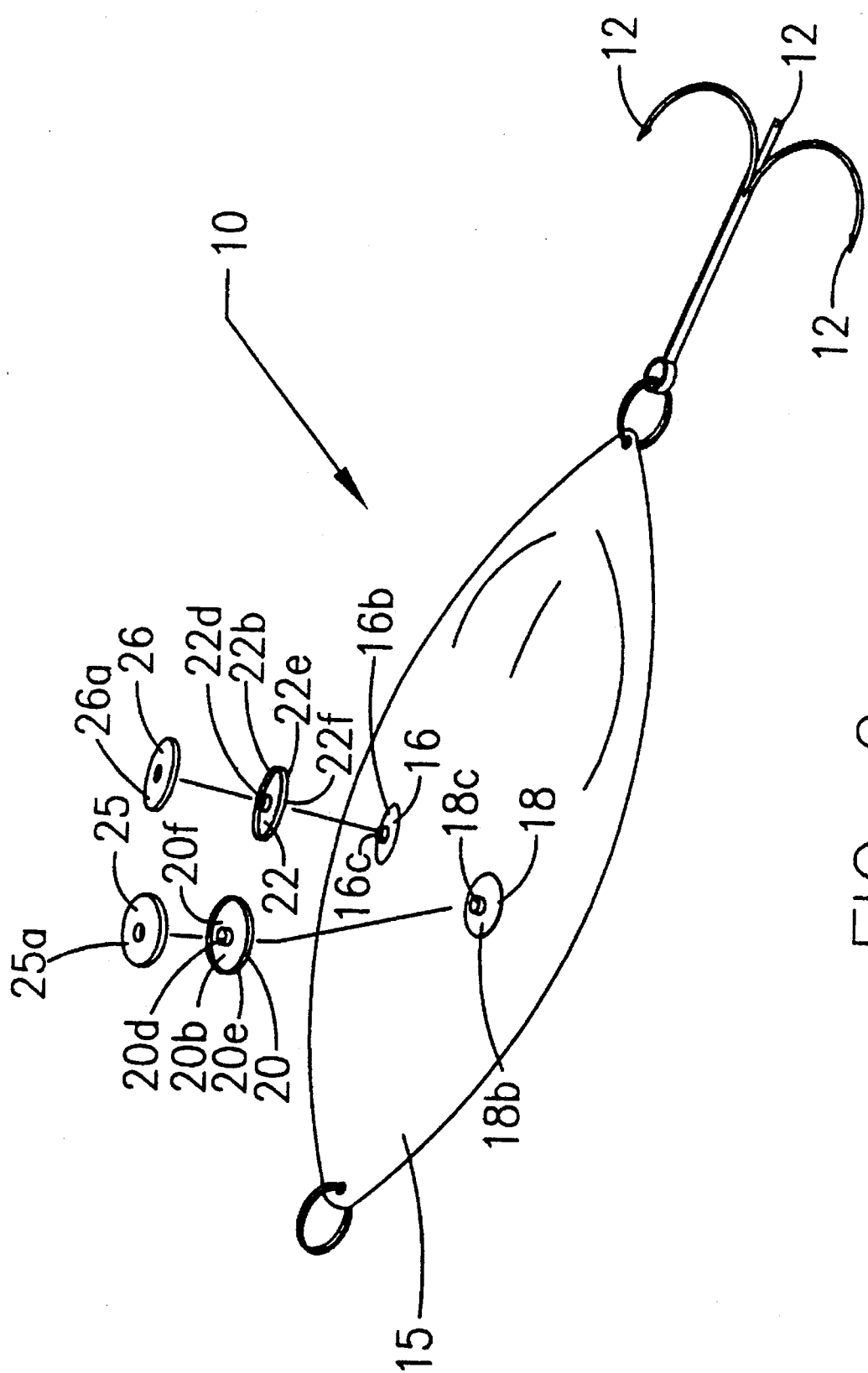
FIG. 2 is an exploded top perspective view of the eyes removed from the fishing lure.
Figure 3:
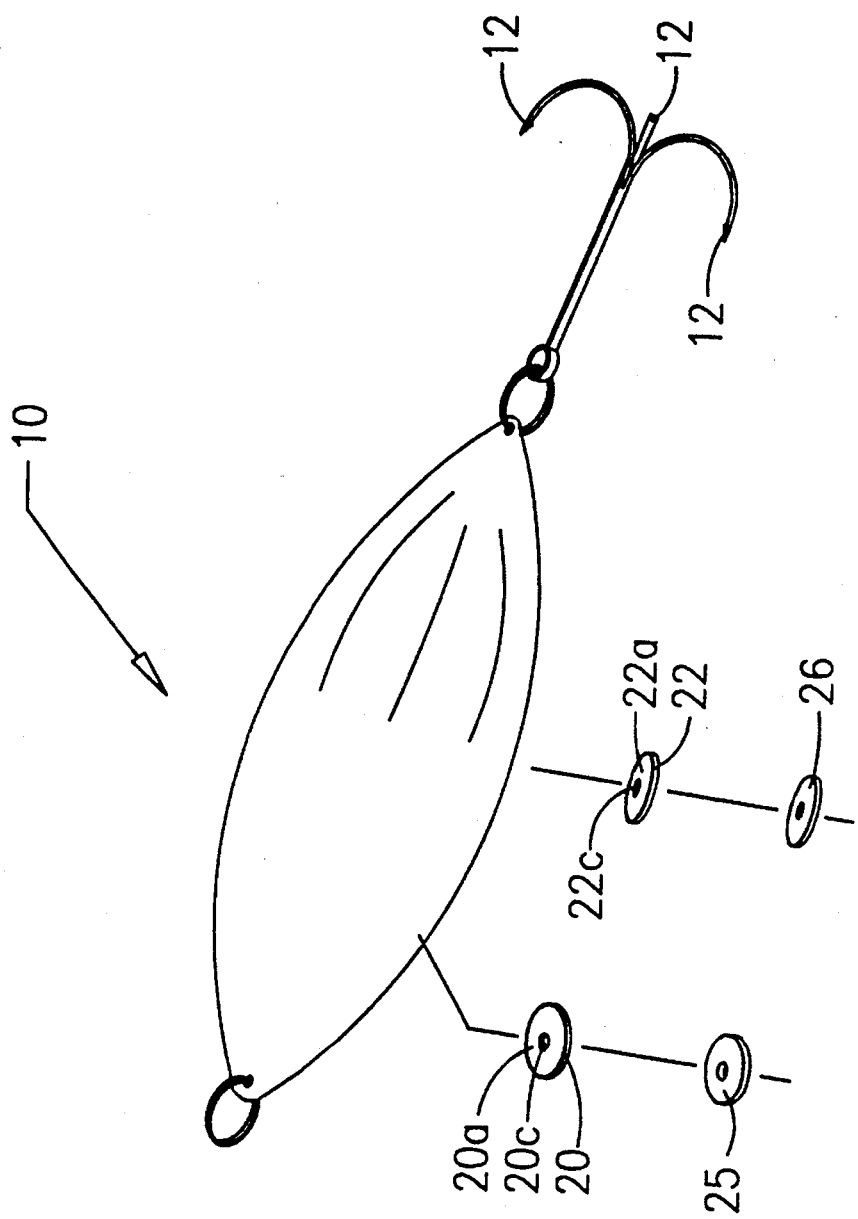
FIG. 3 is an exploded bottom perspective view of the eyes removed from the fishing lure.
Figure 4:
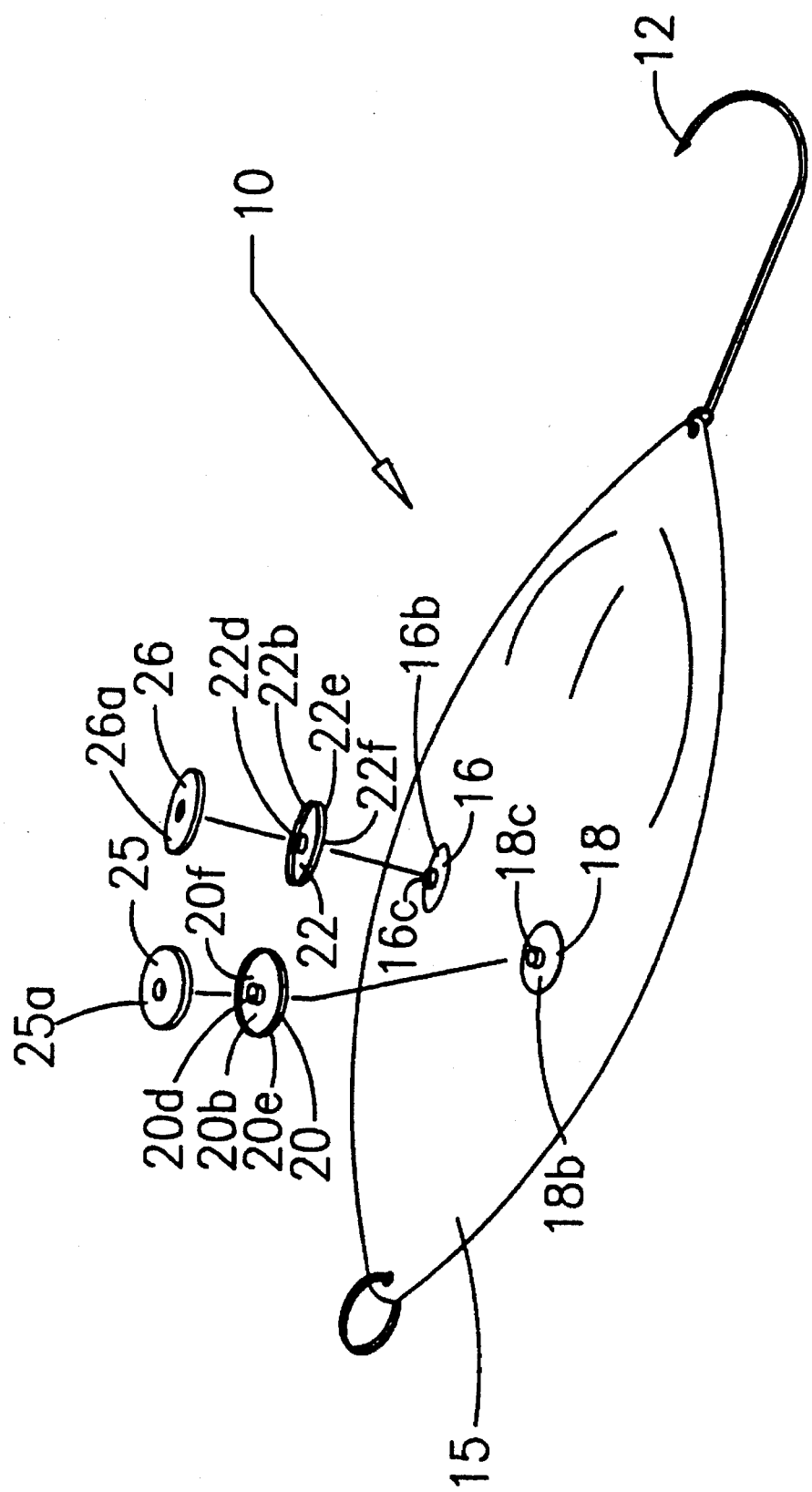
FIG. 4 is an exploded top perspective view of the eyes removed from the fishing lure.

As illustrated in FIG. 1, the eye fastening members 16 & 18 are spaced upon the head 15 of the fishing lures 10 in such a manner that the fishing lures 10 will resemble as much as possible the prey or fish upon which the game fish generally feed so that the game fish will attack the fishing lures 10 as it would attack its prey. As illustrated in FIGS. 2 & 3, each of the eye fastening members 16 & 18 has a first side (not shown) fixedly attached to the fishing lure 10 and has a second side 16b & 18b having a male coupler 16c & 18c centrally disposed thereupon and extending outwardly therefrom for receiving and coupling the simulated eyes 20 & 22 which are also substantially disc-shaped and further each of which has a first side 20a & 22a having a female coupler 20c & 22c centrally extending therein and a pair of biased elements (not shown) transversing a portion of the female coupler 20c & 22c and spaced apart to biasedly receive and hold the male coupler 16c & 18c therebetween in the female coupler 20c & 22c, each of the simulated eyes 20 & 22 also having a second side 20b & 22b having a simulated pupil 20d & 22d centrally and integrally protruding therefrom and further having an annular rim 20e & 22e integrally extending about the perimeter thereof, the annular rim 20e & 22e and the protruding pupil 20d & 22d essentially defining an annular recessed portion 20f & 22f therebetween for receiving and retaining the ring-shaped spongy material 25 & 26 which are removably retentive in the recessed portions 20f & 22f between the rims 20e & 22e and the simulated pupils 20d & 22d. The spongy material 25 & 26 has a plurality of pores 25a & 26a thereabout, which aid in absorbing and retaining fluids such as a fish-alluring scents which are gradually released into the water as water is absorbed into the pores 25a & 26a of the spongy material 25 & 26 thus urging the scents out of the pores 25a & 26a into the water as the fishing lures 10 are put into the water. The spongy material 25 & 26 is also distinctively colored to attract particular game fish. The spongy material 25 & 26 can be dyed any color that causes the game fish to attack that color.

Fish like other animals such as bulls attack certain colors for one reason or another. For example, bulls have a dislike for the color red and will attack anything having that color. Likewise, fish react to other colors in much the same way. That is why the spongy material 25 & 26 can be dyed any color which will cause particular fish to attack it. The interchangeable eyes on the fishing lures 10 make the fishing lures 10 look more real as if they are the actual prey the game fish feed upon. When these fishing lures 10 are put in the water, the game fish will see them and readily attack them as if they were their prey, and the fishermen, as a result of using these fishing lures 10, will have much better luck at catching the types of fish they are fishing for.

Various changes and departures may be made to the invention without departing from the spirit and scope thereof. Accordingly, it is not intended that the invention be limited to that specifically described in the specification or as illustrated in the drawing but only as set forth in the claims:

What is claimed is:

1. Interchangeable eyes for a fishing lure comprising:

eye fastening members secured in spaced relationship on a head of said fishing lure;

simulated eyes detachably attached to said eye fastening members, each of said simulated eyes having a simulated pupil protruding therefrom and a rim extending about the perimeter thereof, said pupil and rim defining an annular portion therebetween; and spongy material removably retentive to each of said eye, for retaining and releasing fish-alluring scents into water to attract fish to said fishing lure, said spongy material being retentively received in said annular portion.

2. Interchange eyes for a fishing lure as described in claim 1, wherein said spongy material is distinctively colored to attract particular fish.

3. Interchangeable eyes for a fishing lure as described in claim 2, wherein said spongy material has a plurality of pores therein for absorbing, retaining, and releasing selected fish-alluring scents to attract the fish.

* * * * *